(12) United States Patent
Wang et al.

(10) Patent No.: US 12,488,820 B2
(45) Date of Patent: Dec. 2, 2025

(54) SPIN-ORBIT TORQUE MAGNETORESISTIVE RANDOM ACCESS MEMORY AND METHOD OF OPERATING THE SAME

(71) Applicant: INSTITUTE OF SEMICONDUCTORS, CHINESE ACADEMY OF SCIENCES, Beijing (CN)

(72) Inventors: Kaiyou Wang, Beijing (CN); Kun Lei, Beijing (CN); Zelalem Abebe Bekele, Beijing (CN); Xiukai Lan, Beijing (CN)

(73) Assignee: INSTITUTE OF SEMICONDUCTORS, CHINESE ACADEMY OF SCIENCES, Beijing (CN)

( * ) Notice: Subject to any disclaimer, the term of this patent is extended or adjusted under 35 U.S.C. 154(b) by 127 days.

(21) Appl. No.: 18/431,533

(22) Filed: Feb. 2, 2024

(65) Prior Publication Data
US 2024/0290367 A1    Aug. 29, 2024

(30) Foreign Application Priority Data
Feb. 28, 2023    (CN) .......................... 202310212574.4

(51) Int. Cl.
    G11C 11/18    (2006.01)
    G11C 11/16    (2006.01)
(52) U.S. Cl.
    CPC ................... G11C 11/161 (2013.01)
(58) Field of Classification Search
    CPC .............. G11C 11/161; G11C 11/1659; G11C 11/1673; G11C 11/1675; G11C 11/18
    See application file for complete search history.

(56) References Cited

U.S. PATENT DOCUMENTS

2015/0236071 A1*    8/2015    Lee .................... G11C 11/161
                                                                  257/421
2017/0125078 A1*    5/2017    Mihajlovic .......... G11C 11/161
(Continued)

FOREIGN PATENT DOCUMENTS

CN    113363378 A    9/2021
CN    114664345 A    6/2022

OTHER PUBLICATIONS

Bekele, Zelalem Abebe, et al., "High-Efficiency Spin-Orbit Torque Switching Using a Single Heavy-Metal Alloy with Opposite Spin Hall Angles", Adv. Electron. Mater. 2020, 2000793; DOI: 10.1002/aelm.202000793, (2020), 7 pgs.
(Continued)

*Primary Examiner* — Hien N Nguyen
(74) *Attorney, Agent, or Firm* — Schwegman Lundberg & Woessner, P.A.

(57) ABSTRACT

A spin-orbit torque magnetoresistive random access memory and a method of operating the same. The memory includes memory cells. Each memory cell includes: an orbital Hall layer for generating an orbital polarized current under an action of an in-plane current; an alloy material layer including an alloy material having spin Hall angles with opposite polarities and for generating spin polarized currents in opposite spin directions under an action of the in-plane current flowing through the alloy material layer and the orbital polarized current; a magnetic tunnel junction, including a magnetic free layer, a tunneling insulation layer, a magnetic pinned layer, and an antiferromagnetic layer or artificial antiferromagnetic layer. A competing spin current effect is generated by the spin polarized currents in the opposite spin directions to induce a deterministic magnetization switching of a magnetic moment of the magnetic free layer, so as to store an information in the memory cell.

20 Claims, 2 Drawing Sheets

(56) References Cited

U.S. PATENT DOCUMENTS

2023/0046923 A1\* 2/2023 Evarts .................... H10B 61/20
2023/0050152 A1\* 2/2023 Hashemi ................ H10N 52/01
2023/0309411 A1 9/2023 Yan et al.

OTHER PUBLICATIONS

Bekele, Zelalem Abebe, et al., "Tuning the High-Efficiency Field-Free Current-Induced Deterministic Switching via Ultrathin PtMo Layer with Mo Content", Adv. Electron. Mater. 2021, 7, 2100528; DOI: 10.1002/aelm.202100528, (Sep. 4, 2021), 7 pgs.

Ma, Qinli, et al., "Switching a Perpendicular Ferromagnetic Layer by Competing Spin Currents", Physical Review Letters 120, 117703 (2018), (Mar. 16, 2018), 6 pgs.

Sala, Giacomo, et al., "Giant orbital Hall effect and orbital-to-spin conversion in 3d, 5d, and 4f metallic heterostructures", Physical Review Research 4, 033037 (2022), (Jul. 13, 2022), 14 pgs.

Tanaka, T., et al., "Intrinsic spin Hall effect and orbital Hall effect in 4d and 5d transition metals", Physical Review B 77, 165117 (2008); DOI: 10.1103/PhysRevB.77.165117, (Apr. 11, 2008), 16 pgs.

\* cited by examiner

SPIN-ORBIT TORQUE MAGNETORESISTIVE RANDOM ACCESS MEMORY AND METHOD OF OPERATING THE SAME

This application claims priority to Chinese Patent Application No. 2023102112574.4, filed on Feb. 28, 2023, the entire content of which is incorporated herein in its entirety by reference.

TECHNICAL FIELD

The present disclosure relates to a spin-orbit torque magnetoresistive random access memory, and in particular, to a fully electronically controlled spin-orbit torque magnetoresistive random access memory in which a competing spin current is enhanced based on an orbital Hall effect, and a method of operating the spin-orbit torque magnetoresistive random access memory.

BACKGROUND

Spin-orbit torque magnetoresistive random access memory (SOT-MRAM) is a magnetoresistive random access memory that performs a random storage using a magnetic moment switching. As a new generation of magnetic storage device, the spin-orbit torque magnetoresistive random access memory has characteristics of high stability, high durability, and high read-write speed, etc., and has a great application potential in fields of storage, logic, and brain-like computing. An existing SOT-MRAM requires an assistance of an external magnetic field to achieve a deterministic magnetization switching of a magnetic layer, but a non-locality of the magnetic field is not conducive to a high-density integration of the SOT-MRAM. So far, many solutions for electronically controlled magnetic switching without assistance of external magnetic field have been proposed, such as gradient spin current, competing spin current, localized laser annealing, etc.

SUMMARY

In view of this, the present disclosure provides a spin-orbit torque magnetoresistive random access memory to achieve an electronically controlled magnetic switching without an assistance of an external magnetic field, by using an orbital Hall layer and an alloy material layer, which is beneficial to reducing a critical switching current density of the memory.

The present disclosure provides a spin-orbit torque magnetoresistive random access memory, including a plurality of memory cells arranged in an array. Each of the plurality of memory cells includes:

an orbital Hall layer configured to generate an orbital polarized current under an action of an in-plane current flowing through the orbital Hall layer;

an alloy material layer including an alloy material having spin Hall angles with opposite polarities, where the alloy material layer is on the orbital Hall layer and is configured to generate a spin polarized current in a first spin direction and a spin polarized current in a second spin direction opposite to the first spin direction under an action of the in-plane current flowing through the alloy material layer and the orbital polarized current;

a magnetic tunnel junction on the alloy material layer, where the magnetic tunnel junction includes from bottom to top: a magnetic free layer on the alloy material layer, where the magnetic free layer has a vertical anisotropy, a tunneling insulation layer including an oxide film, a magnetic pinned layer having a fixed magnetization direction, where the magnetic pinned layer has a vertical anisotropy, and an antiferromagnetic layer or artificial antiferromagnetic layer configured to pin a magnetization direction of the magnetic pinned layer, so that the magnetization direction of the magnetic pinned layer remains fixed; and a protective layer configured to prevent the magnetic tunnel junction from being oxidized, wherein a competing spin current effect is generated by the spin polarized current in the first spin direction and the spin polarized current in the second spin direction opposite to the first spin direction to induce a deterministic magnetization switching of a magnetic moment of the magnetic free layer, so as to store an information in the memory cell.

The present disclosure further provides a method of operating the spin-orbit torque magnetoresistive random access memory described above, including: providing the in-plane current flowing through the orbital Hall layer and the alloy material layer to induce the deterministic magnetization switching of the magnetization direction of the magnetic free layer, so as to change a relative magnetization direction between the magnetic free layer and the magnetic pinned layer, and write data to the memory cell; and providing a vertical current flowing through the magnetic tunnel junction to read a stored information from the memory cell.

DETAILED DESCRIPTION OF EMBODIMENTS

Figure 1:
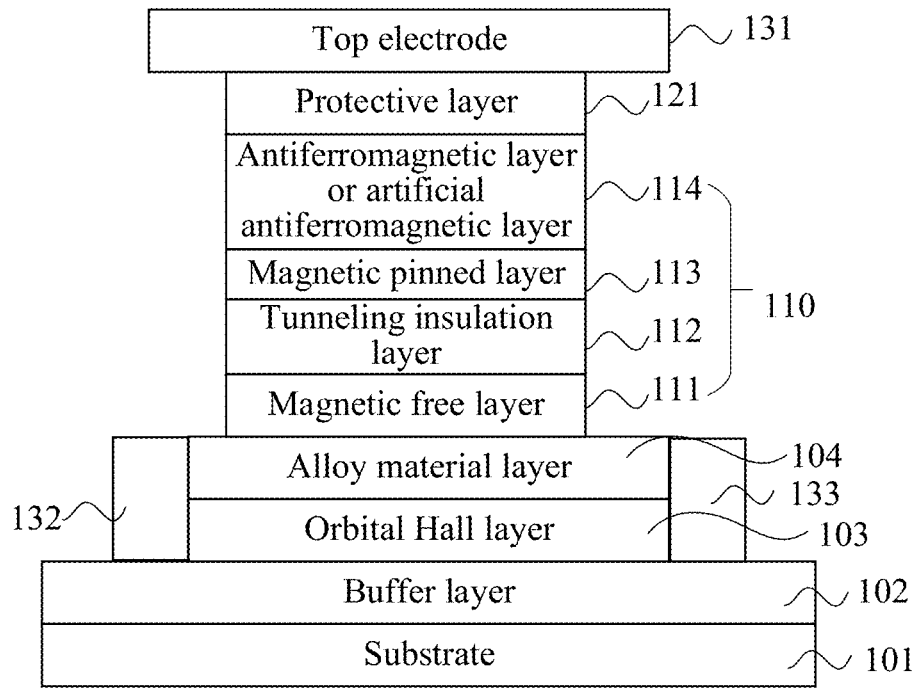
FIG. 1 shows a schematic cross-sectional view of a spin-orbit torque magnetoresistive random access memory cell according to embodiments of the present disclosure.

In order to make objectives, technical solutions and advantages of the present disclosure clearer, the present disclosure will be further described in detail below in conjunction with specific embodiments and with reference to accompanying drawings. However, the present disclosure may be implemented in different forms and should not be construed as being limited to embodiments set forth herein. Rather, these embodiments are provided so that the present disclosure will be thorough and complete, and the scope of the present disclosure may be fully conveyed to those skilled in the art. In the accompanying drawings, sizes and relative sizes of layers and regions may be exaggerated for clarity, and the same reference numeral indicates the same element throughout.

Terms used herein are just for a purpose of describing specific embodiments and are not intended to limit the present disclosure. The terms "include", "comprise" and the like used herein indicate a presence of feature, step, operation and/or component, but do not exclude a presence or addition of one or more other features, steps, operations or components.

FIG. 1 shows a schematic cross-sectional view of a spin-orbit torque magnetoresistive random access memory cell according to embodiments of the present disclosure.

According to an exemplary embodiment of the present disclosure, the present disclosure provides a spin-orbit torque magnetoresistive random access memory, including a plurality of memory cells arranged in an array. As shown in FIG. 1, each memory cell includes: an orbital Hall layer 103, an alloy material layer 104, a magnetic tunnel junction 110, and a protective layer 121.

According to embodiments of the present disclosure, the orbital Hall layer 103 is used to generate an orbital polarized current under an action of an in-plane current flowing through the orbital Hall layer 103; an alloy material layer 104 including two materials having spin Hall angles with opposite polarities, where the alloy material layer 104 is on the orbital Hall layer 103 and is used to generate a spin polarized current in a first spin direction and a spin polarized current in a second spin direction opposite to the first spin direction under an action of the in-plane current flowing through the alloy material layer 104 and the orbital polarized current; a magnetic tunnel junction 110 formed on the alloy material layer 104, where the magnetic tunnel junction 110 includes from bottom to top: a magnetic free layer 111 on the alloy material layer 104, a tunneling insulation layer 112 including an oxide film, a magnetic pinned layer 113 having a fixed magnetization direction, where the magnetic free layer 111 and the magnetic pinned layer 113 have a vertical anisotropy, and an antiferromagnetic layer or artificial antiferromagnetic layer 114 used to pin a magnetization direction of the magnetic pinned layer 113 so that the magnetization direction of the magnetic pinned layer 113 remains fixed; and a protective layer 121 used to prevent the magnetic tunnel junction 110 from being oxidized. A competing spin current effect is generated by the spin polarized current in the first spin direction and the spin polarized current in the second spin direction opposite to the first spin direction to induce a deterministic magnetization switching of a magnetic moment of the magnetic free layer 111, so as to store an information in the memory cell.

According to embodiments of the present disclosure, each memory cell also includes: a top electrode 131 on the protective layer 121; and a first bottom electrode 132 and a second bottom electrode 133 at opposite ends of the orbital Hall layer 103 and the alloy material layer 104, respectively. The first bottom electrode 132 and the second bottom electrode 133 are used to provide the in-plane current flowing through the orbital Hall layer 103 and the alloy material layer 104. The top electrode 131 and one of the first bottom electrode 132 and the second bottom electrode 133 are used to provide a vertical current flowing through the magnetic tunnel junction 110.

According to embodiments of the present disclosure, the information is stored in the memory cell by: providing an in-plane current in a first direction to the orbital Hall layer 103 and the alloy material layer 104 to induce a deterministic magnetization switching of the magnetic moment of the magnetic free layer 111, so as to write data "0" to the memory cell; and providing an in-plane current in a second direction opposite to the first direction to the orbital Hall layer 103 and the alloy material layer 104 to induce a deterministic magnetization switching of the magnetic moment of the magnetic free layer 111, so as to write data "1" to the memory cell. It should be noted that a switching direction of the magnetic moment of the magnetic free layer 111 is controlled by a direction of the in-plane current provided to the orbital Hall layer 103.

According to embodiments of the present disclosure, the plurality of memory cells are arranged in an array on the substrate 101, and a buffer layer 102 is between the substrate 101 and the memory cells.

According to embodiments of the present disclosure, the orbital Hall layer 103 is formed of a material having an orbital Hall effect, so as to generate the orbital polarized current under the action of the in-plane current. The material of the orbital Hall layer 103 includes at least one of Mo, Ir, Ti, V, or Cr.

According to embodiments of the present disclosure, the alloy material layer 104 includes a binary alloy material or multi-element alloy material having spin Hall angles with opposite polarities, and is used to generate spin polarized currents in opposite spin directions.

According to embodiments of the present disclosure, the alloy material layer 104 includes: an alloy material X-Y composed of a heavy metal element X and a rare earth element Y, or an alloy material A-B composed of a transition metal A having a positive spin Hall angle and a transition metal B having a negative spin Hall angle. The heavy metal element X includes at least one of Pt, Ta, or W. The rare earth element Y includes at least one of Gd, Tb, Dy, or Ho. The transition metal A having a positive Holzer spin angle includes at least one of Pt, Pd, Rh, or Ru. The transition metal B having a negative Holzer spin angle includes at least one of Hf, Ta, W, Nb, or Mo. For example, the alloy material layer 104 is an alloy composed of different elements with a precious control of composition, which may be $Pt_{1-x}Gd_x$ or $Pt_{1-x}Ta_x$.

According to embodiments of the present disclosure, a material of the magnetic free layer 111 includes at least one of: a ferromagnetic material, a ferrimagnetic material, or an alloy material x-y composed of a ferromagnetic material x and a non-magnetic material y. The ferromagnetic material includes at least one of Co, CoFe, CoFeB, or NiFe. The ferrimagnetic material includes at least one of CoCr, CoGd, CoTb, CoDy, CoHo, or GdFeCo. The ferromagnetic material x includes at least one of Fe, Co, or Ni. The non-magnetic material y includes at least one of Ti, Ir, Mo, or Pt.

According to embodiments of the present disclosure, a material of the tunneling insulation layer 112 includes at least one of MgO, $AlO_x$, or SiN.

According to embodiments of the present disclosure, a material of the magnetic pinned layer 113 includes at least one of a ferromagnetic material or a ferrimagnetic alloy material. The ferromagnetic material includes at least one of Co, CoFe, CoFeB, or NiFe. The ferrimagnetic alloy material includes at least one of CoCr, CoGd, CoTb, CoDy, CoHo, or GdFeCo.

According to embodiments of the present disclosure, the antiferromagnetic layer or artificial antiferromagnetic layer 114 is formed of an antiferromagnetic material or has an artificial antiferromagnetic layer structure. The antiferromagnetic material includes at least one of IrMn, PtMn, or FeMn.

The present disclosure further provides a method of manufacturing a spin-orbit torque magnetoresistive random access memory, which is suitable for manufacturing the spin-orbit torque magnetoresistive random access memory described above. The method includes: forming a plurality of memory cells arranged in an array on a substrate with a buffer layer, including: forming an orbital Hall layer 103 on the buffer layer by using thin film growth means such as magnetron sputtering; forming an alloy material layer 104 on the orbital Hall layer 103 by using thin film growth means such as magnetron sputtering; sequentially forming a magnetic free layer 111, a tunneling insulation layer 112 and a magnetic pinned layer 113 on the alloy material layer 104 by using thin film growth means such as magnetron sputtering; sequentially forming an antiferromagnetic layer or artificial antiferromagnetic layer 114 and a protective layer 121 on the magnetic pinned layer 113.

Figure 2:
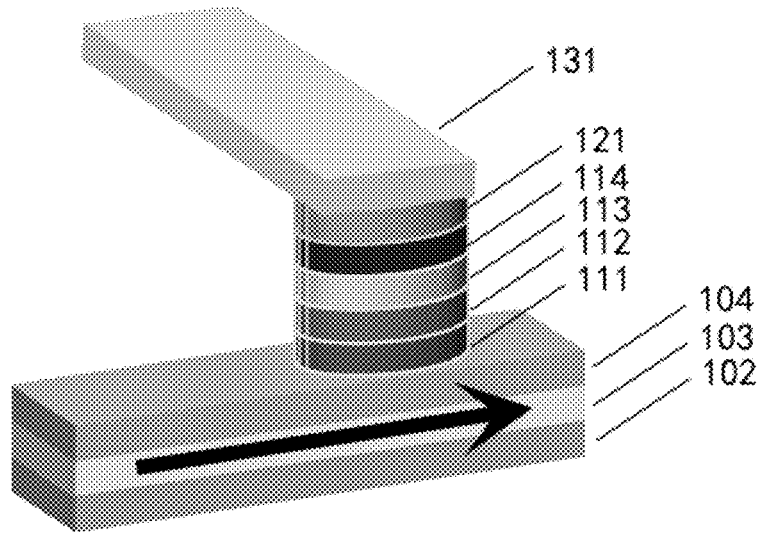
FIG. 2 shows a schematic diagram of a writing process of a spin-orbit torque magnetoresistive random access memory according to embodiments of the present disclosure.

FIG. 2 shows a schematic diagram of a writing process of a spin-orbit torque magnetoresistive random access memory according to embodiments of the present disclosure.

According to embodiments of the present disclosure, the present disclosure further provides a method of operating the spin-orbit torque magnetoresistive random access memory described above. Referring to FIG. 2, the method includes: providing an in-plane current flowing through the orbital Hall layer 103 and the alloy material layer 104 to induce a deterministic magnetization switching of a magnetization direction of the magnetic free layer 111, so as to change a relative magnetization direction between the magnetic free layer 111 and the magnetic pinned layer 113 and write data to the memory cell; and providing a vertical current flowing through the magnetic tunnel junction 110 to read a stored information from the memory cell.

According to embodiments of the present disclosure, an in-plane current in the first direction is provided to the orbital Hall layer 103 and the alloy material layer 104 to write data "0" to the memory cell, and an in-plane current in a second direction opposite to the first direction is provided to the orbital Hall layer 103 and the alloy material layer 104 to write data "1" to the memory cell.

Figure 3:
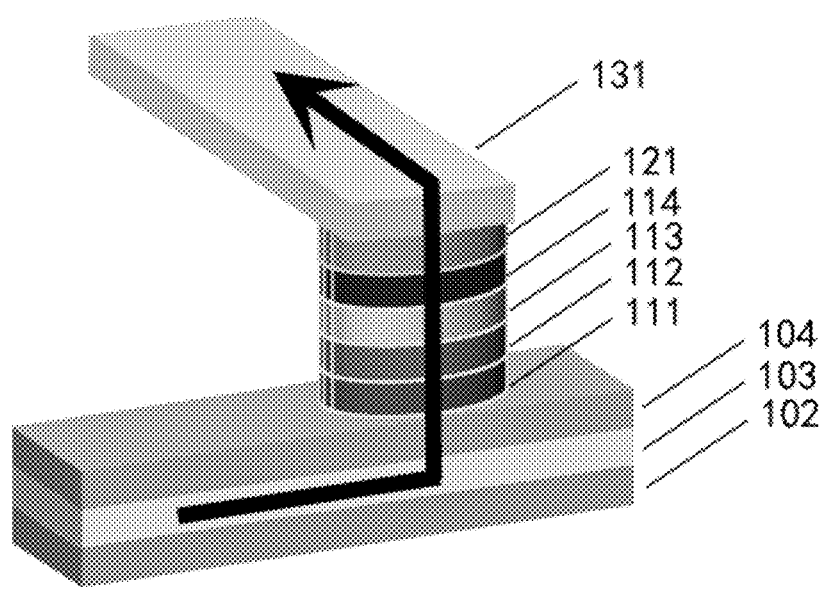
FIG. 3 shows a schematic diagram of a reading process of a spin-orbit torque magnetoresistive random access memory according to embodiments of the present disclosure.

FIG. 3 shows a schematic diagram of a reading process of a spin-orbit torque magnetoresistive random access memory according to embodiments of the present disclosure.

According to embodiments of the present disclosure, referring to FIG. 3, a vertical current flowing through the magnetic tunnel junction 110 is provided to detect a resistance state of the magnetic tunnel junction 110, so as to determine the stored information in the magnetic tunnel junction 110. For example, the vertical current flowing through the magnetic tunnel junction 110 is provided to measure the resistance state of the magnetic tunnel junction 110. In response to reading out a low resistance state, the data "1" may be read out; and in response to reading out a high resistance state, the data "O" may be read out.

According to the spin-orbit torque magnetoresistive random access memory provided by the aforementioned embodiments of the present disclosure, an in-plane current flowing through the orbital Hall layer and the alloy material layer is provided, an orbital polarized current is generated by the orbital Hall layer under the action of the in-plane current, and the orbital polarized current diffused to the alloy material layer and the in-plane current are converted into spin polarized currents in opposite spin directions, which may generate a competing spin current effect to induce the deterministic magnetization switching of the magnetic moment of the magnetic free layer, so as to store an information in the memory cell, thereby achieving an electrically controlled magnetic switching without an assistance of an external magnetic field.

According to the spin-orbit torque magnetoresistive random access memory provided by the aforementioned embodiments of the present disclosure, by providing the orbital Hall layer and the alloy material layer, the orbital polarized current and the in-plane current may be converted into spin polarized currents in opposite spin directions, so as to achieve a deterministic switching of the magnetic free layer. Different from a structure without an orbital Hall layer and thus without a generation of orbital polarized current, the present disclosure may be implemented to effectively reduce a critical switching current density of the device, that is, a current density of the in-plane current that may achieve the deterministic switching of the magnetic free layer is reduced.

The specific embodiments described above further describe the objectives, technical solutions and advantages of the present disclosure in further detail. It should be understood that the above descriptions are just specific embodiments of the present disclosure and are not intended to limit the present disclosure. Any modifications, equivalent substitutions, improvements, etc., made within the spirit and principle of the present disclosure should be included within the scope of protection of the present disclosure.

What is claimed is:

1. A spin-orbit torque magnetoresistive random access memory, comprising a plurality of memory cells arranged in an array, wherein each of the plurality of memory cells comprises:
    an orbital Hall layer configured to generate an orbital polarized current under an action of an in-plane current flowing through the orbital Hall layer;
    an alloy material layer comprising an alloy material having spin Hall angles with opposite polarities, wherein the alloy material layer is on the orbital Hall layer and is configured to generate a spin polarized current in a first spin direction and a spin polarized current in a second spin direction opposite to the first spin direction under an action of the in-plane current flowing through the alloy material layer and the orbital polarized current;
    a magnetic tunnel junction on the alloy material layer, wherein the magnetic tunnel junction comprises from bottom to top:
        a magnetic free layer on the alloy material layer, wherein the magnetic free layer has a vertical anisotropy,
        a tunneling insulation layer comprising an oxide film,
        a magnetic pinned layer having a fixed magnetization direction, wherein the magnetic pinned layer has a vertical anisotropy, and
        an antiferromagnetic layer or artificial antiferromagnetic layer configured to pin a magnetization direction of the magnetic pinned layer, so that the magnetization direction of the magnetic pinned layer remains fixed; and
    a protective layer configured to prevent the magnetic tunnel junction from being oxidized,
    wherein a competing spin current effect is generated by the spin polarized current in the first spin direction and the spin polarized current in the second spin direction opposite to the first spin direction to induce a deterministic magnetization switching of a magnetic moment of the magnetic free layer, so as to store an information in the memory cell.

2. The spin-orbit torque magnetoresistive random access memory according to claim 1, wherein each of the plurality of memory cells further comprises:
    a top electrode on the protective layer; and
    a first bottom electrode and a second bottom electrode at opposite ends of the orbital Hall layer and the alloy material layer, respectively,
    wherein the first bottom electrode and the second bottom electrode are configured to provide the in-plane current flowing through the orbital Hall layer and the alloy material layer, and wherein the top electrode and one of the first bottom electrode and the second bottom electrode are configured to provide a vertical current flowing through the magnetic tunnel junction.

3. The spin-orbit torque magnetoresistive random access memory according to claim 1, wherein the information is stored in the memory cell by:
providing an in-plane current in a first direction to the orbital Hall layer and the alloy material layer to induce the deterministic magnetization switching of the magnetic moment of the magnetic free layer, so as to write data "0" to the memory cell;
providing an in-plane current in a second direction opposite to the first direction to the orbital Hall layer and the alloy material layer to induce the deterministic magnetization switching of the magnetic moment of the magnetic free layer, so as to write data "1" to the memory cell.

4. The spin-orbit torque magnetoresistive random access memory according to claim 1, wherein the orbital Hall layer is formed of a material having an orbital Hall effect, so as to generate the orbital polarized current under the action of the in-plane current.

5. The spin-orbit torque magnetoresistive random access memory according to claim 4, wherein the material of the orbital Hall layer comprises at least one of Mo, Ir, Ti, V, or Cr.

6. The spin-orbit torque magnetoresistive random access memory according to claim 1, wherein the alloy material layer comprises a binary alloy material or multi-element alloy material having spin Hall angles with opposite polarities, and is configured to generate spin polarized currents in opposite spin directions,
wherein the alloy material layer comprises: an alloy material X-Y composed of a heavy metal element X and a rare earth element Y, or an alloy material A-B composed of a transition metal A having a positive spin Hall angle and a transition metal B having a negative spin Hall angle,
wherein the heavy metal element X comprises at least one of Pt, Ta, or W,
wherein the rare earth element Y comprises at least one of Gd, Tb, Dy, or Ho,
wherein the transition metal A having the positive spin Hall angle comprises at least one of Pt, Pd, Rh, or Ru, and
wherein the transition metal B having the negative spin Hall angle comprises at least one of Hf, Ta, W, Nb, or Mo.

7. The spin-orbit torque magnetoresistive random access memory according to claim 1, wherein a material of the magnetic free layer comprises: a ferromagnetic material, a ferrimagnetic material, or an alloy material x-y composed of a ferromagnetic material x and a non-magnetic material y,
wherein the ferromagnetic material comprises at least one of Co, CoFe, CoFeB, or NiFe,
wherein the ferrimagnetic material comprises at least one of CoCr, CoGd, CoTb, CoDy, CoHo, or GdFeCo,
wherein the ferromagnetic material x comprises at least one of Fe, Co, or Ni, and
wherein the non-magnetic material y comprises at least one of Ti, Ir, Mo, or Pt.

8. The spin-orbit torque magnetoresistive random access memory according to claim 1, wherein a material of the tunneling insulation layer comprises at least one of MgO, $AlO_x$, or SiN.

9. The spin-orbit torque magnetoresistive random access memory according to claim 8, wherein a material of the magnetic pinned layer comprises at least one of a ferromagnetic material or a ferrimagnetic alloy material,
wherein the ferromagnetic material comprises at least one of Co, CoFe, CoFeB, or NiFe, and
wherein the ferrimagnetic alloy material comprises at least one of CoCr, CoGd, CoTb, CoDy, CoHo, or GdFeCo.

10. The spin-orbit torque magnetoresistive random access memory according to claim 1, wherein the antiferromagnetic layer or artificial antiferromagnetic layer is formed of an antiferromagnetic material or has an artificial antiferromagnetic layer structure, and
wherein the antiferromagnetic material comprises at least one of IrMn, PtMn, or FeMn.

11. A method of operating the spin-orbit torque magnetoresistive random access memory according to claim 1, comprising:
providing the in-plane current flowing through the orbital Hall layer and the alloy material layer to induce the deterministic magnetization switching of the magnetization direction of the magnetic free layer, so as to change a relative magnetization direction between the magnetic free layer and the magnetic pinned layer, and write data to the memory cell; and
providing a vertical current flowing through the magnetic tunnel junction to read a stored information from the memory cell.

12. The method according to claim 11, wherein an in-plane current in a first direction is provided to the orbital Hall layer and the alloy material layer to write data "0" to the memory cell, and an in-plane current in a second direction opposite to the first direction is provided to the orbital Hall layer and the alloy material layer to write data "1" to the memory cell, and
wherein the vertical current flowing through the magnetic tunnel junction is provided to detect a resistance state of the magnetic tunnel junction, so as to read the stored information from the memory cell.

13. A method of operating the spin-orbit torque magnetoresistive random access memory according to claim 2, comprising:
providing the in-plane current flowing through the orbital Hall layer and the alloy material layer to induce the deterministic magnetization switching of the magnetization direction of the magnetic free layer, so as to change a relative magnetization direction between the magnetic free layer and the magnetic pinned layer, and write data to the memory cell; and
providing the vertical current flowing through the magnetic tunnel junction to read a stored information from the memory cell.

14. The method according to claim 13, wherein an in-plane current in a first direction is provided to the orbital Hall layer and the alloy material layer to write data "0" to the memory cell, and an in-plane current in a second direction opposite to the first direction is provided to the orbital Hall layer and the alloy material layer to write data "1" to the memory cell, and
wherein the vertical current flowing through the magnetic tunnel junction is provided to detect a resistance state of the magnetic tunnel junction, so as to read the stored information from the memory cell.

15. A method of operating the spin-orbit torque magnetoresistive random access memory according to claim 3, comprising:

providing the in-plane current flowing through the orbital Hall layer and the alloy material layer to induce the deterministic magnetization switching of the magnetization direction of the magnetic free layer, so as to change a relative magnetization direction between the magnetic free layer and the magnetic pinned layer, and write data to the memory cell; and providing a vertical current flowing through the magnetic tunnel junction to read a stored information from the memory cell.

16. The method according to claim 15, wherein the in-plane current in the first direction is provided to the orbital Hall layer and the alloy material layer to write data "0" to the memory cell, and the in-plane current in the second direction opposite to the first direction is provided to the orbital Hall layer and the alloy material layer to write data "1" to the memory cell, and wherein the vertical current flowing through the magnetic tunnel junction is provided to detect a resistance state of the magnetic tunnel junction, so as to read the stored information from the memory cell.

17. A method of operating the spin-orbit torque magnetoresistive random access memory according to claim 4, comprising:

providing the in-plane current flowing through the orbital Hall layer and the alloy material layer to induce the deterministic magnetization switching of the magnetization direction of the magnetic free layer, so as to change a relative magnetization direction between the magnetic free layer and the magnetic pinned layer, and write data to the memory cell; and providing a vertical current flowing through the magnetic tunnel junction to read a stored information from the memory cell.

18. The method according to claim 17, wherein an in-plane current in a first direction is provided to the orbital Hall layer and the alloy material layer to write data "0" to the memory cell, and an in-plane current in a second direction opposite to the first direction is provided to the orbital Hall layer and the alloy material layer to write data "1" to the memory cell, and wherein the vertical current flowing through the magnetic tunnel junction is provided to detect a resistance state of the magnetic tunnel junction, so as to read the stored information from the memory cell.

19. A method of operating the spin-orbit torque magnetoresistive random access memory according to claim 5, comprising:

providing the in-plane current flowing through the orbital Hall layer and the alloy material layer to induce the deterministic magnetization switching of the magnetization direction of the magnetic free layer, so as to change a relative magnetization direction between the magnetic free layer and the magnetic pinned layer, and write data to the memory cell; and providing a vertical current flowing through the magnetic tunnel junction to read a stored information from the memory cell.

20. The method according to claim 19, wherein an in-plane current in a first direction is provided to the orbital Hall layer and the alloy material layer to write data "O" to the memory cell, and an in-plane current in a second direction opposite to the first direction is provided to the orbital Hall layer and the alloy material layer to write data "1" to the memory cell, and wherein the vertical current flowing through the magnetic tunnel junction is provided to detect a resistance state of the magnetic tunnel junction, so as to read the stored information from the memory cell.

* * * * *